United States Patent
Ono et al.

(10) Patent No.: US 8,771,122 B2
(45) Date of Patent: *Jul. 8, 2014

(54) VEHICLE POWER OUTPUT DEVICE

(75) Inventors: Junya Ono, Wako (JP); Asuka Ito, Wako (JP); Jun Adachi, Wako (JP); Eisuke Kajihara, Wako (JP); Dai Kataoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 13/565,477

(22) Filed: Aug. 2, 2012

(65) Prior Publication Data

US 2013/0085029 A1 Apr. 4, 2013

(30) Foreign Application Priority Data

Sep. 30, 2011 (JP) ................................ 2011-216808
Sep. 30, 2011 (JP) ................................ 2011-216812

(51) Int. Cl.
*F16H 37/06* (2006.01)
(52) U.S. Cl.
USPC .......................................... 475/149; 475/213
(58) Field of Classification Search
None
See application file for complete search history.

(56) References Cited

U.S. PATENT DOCUMENTS

| 5,509,491 A * | 4/1996 | Hall, III ........................ 180/9.44 |
| 7,427,252 B2 * | 9/2008 | Holmes ............................. 475/5 |
| 8,454,466 B2 * | 6/2013 | Samie et al. ....................... 475/8 |
| 8,500,590 B2 * | 8/2013 | Showalter ...................... 475/154 |
| 8,534,408 B2 * | 9/2013 | Kajihara et al. ............... 180/220 |
| 2007/0173366 A1 * | 7/2007 | Goma Ayats ................. 475/207 |
| 2009/0156351 A1 * | 6/2009 | Brouwer et al. .............. 475/221 |

FOREIGN PATENT DOCUMENTS

JP          4229156 B2    12/2008

* cited by examiner

*Primary Examiner* — David D Le
*Assistant Examiner* — Huan Le
(74) *Attorney, Agent, or Firm* — Birch, Stewart, Kolasch & Birch, LLP

(57) ABSTRACT

A vehicle power output device for driving a first and second rotary electric machine in an efficient range in a wide driving region and for eliminating the need for a complicated mechanism and control. A planetary gear mechanism combines the rotational drive force of a first shaft rotationally driven by a first rotary electric machine and the rotational drive force of a second shaft rotationally driven by a second rotary electric machine and transmits the combined rotational drive force to a drive shaft with the rotational speed increased. The rotational drive force of the second shaft in the forward direction is transmitted to the planetary gear mechanism via a first one-way clutch unit and a first power transmitting mechanism. The rotational drive force of the second shaft in the opposite direction is transmitted to the drive shaft via a second one-way clutch unit and a second power transmitting mechanism.

15 Claims, 12 Drawing Sheets

VEHICLE POWER OUTPUT DEVICE

CROSS-REFERENCE TO RELATED APPLICATIONS

The present application claims priority under 35 USC 119 to Japanese Patent Application No. 2011-216808 filed Sep. 30, 2011 and Japanese Patent Application No. 2011-216812 filed Sep. 30, 2011 the entire contents of which are hereby incorporated by reference.

BACKGROUND OF THE INVENTION

1. Field of the Invention

The present invention relates to a vehicle power output device for outputting a rotational drive force to a drive shaft. The present invention relates to a vehicle energy regenerating device that converts the rotational drive force of a drive shaft to electric energy.

2. Description of Background Art

A hybrid vehicle is known that includes a power output device having a first rotary electric machine and a second rotary electric machine.

There has been proposed a technical idea for this type of power output device wherein the engagement/disengagement of a clutch provided between a planetary gear mechanism to which a first rotor shaft of a first rotary electric machine and a second rotor shaft of a second rotary electric machine are connected and a transmission mechanism to which a drive shaft is connected is controlled to thereby transmit the resultant force of the selected rotational drive force of the first rotor shaft and the selected rotational drive force of the second rotor shaft to the drive shaft via the transmission mechanism. See, for example, Japanese Patent No. 4229156.

According to the above-described conventional technique, the resultant force of the selected rotational drive force of the first rotor shaft and the selected rotational drive force of the second rotor shaft can be transmitted to the drive shaft and thus the driving mode can be switched depending on the driving state. That is, in a wide driving region of the vehicle, the first rotary electric machine and the second rotary electric machine can be driven in an efficient range.

However, in this case, the engagement/disengagement of the clutch needs to be controlled in the switching of the driving mode and therefore there is a problem that this kind of mechanism and control is complicated.

A conventional energy regenerating device is utilized to perform a speed reduction (regenerative brake) of the vehicle by transmitting the rotational drive force of a drive shaft to a rotor of an electric generator to generate electric power during operation of the vehicle.

With regard to a power output device of a hybrid vehicle including a first rotary electric machine and a second rotary electric machine, there has been proposed a technical idea in which engagement/disengagement of a clutch provided between a planetary gear mechanism to which a first rotor of the first rotary electric machine and a second rotor of the second rotary electric machine are connected and a transmission mechanism to which a drive shaft is connected is controlled to thereby output the resultant force of the selected rotational drive force of the first rotor and the selected rotational drive force of the second rotor to the drive shaft via the transmission mechanism. See, for example, Japanese Patent No. 4229156.

The power output device described in the above-mentioned Japanese Patent No. 4229156 can be utilized as an energy regenerating device by transmitting the rotational drive force of the drive shaft to the first rotor and making the first rotary electric machine function as an electric generator for example.

In this case, for enhancement in the efficiency of the conversion to electric energy, it is preferable, for example, that the rotational drive force of the drive shaft should be transmitted to only the first rotor without being transmitted to the second rotor. However, if the configuration of the above-described power output device is utilized as the energy regenerating device as it is, engagement/disengagement of a plurality of clutches needs to be controlled and therefore there is a problem in that this kind of mechanism and control is complicated.

SUMMARY AND OBJECTS OF THE INVENTION

The present invention is devised in view of such a problem and an object of an embodiment is to provide a vehicle power output device that can drive the first rotary electric machine and the second rotary electric machine in an efficient range in a wide driving region and can eliminate the need for complicated mechanism and control.

According to an embodiment of the present invention, a vehicle power output device (21) is provided for outputting a rotational drive force to a drive shaft (32). The vehicle power output device (21) includes a first rotary electric machine (24) capable of rotating a first shaft (26), a second rotary electric machine (64) capable of rotating a second shaft (66) in both forward and opposite directions, and a planetary gear mechanism (30) to which the first shaft (26) and the drive shaft (32) are connected. The vehicle power output device (21) further includes a first power transmitting mechanism (68) that transmits a rotational drive force of the second shaft (66) to the planetary gear mechanism (30) and a second power transmitting mechanism (70) that transmits a rotational drive force of the second shaft (66) to the drive shaft (32). The vehicle power output device (21) further includes a first one-way clutch unit (72) that permits transmission of a rotational drive force from the second shaft (66) to the first power transmitting mechanism (68) only when the second shaft (66) rotates in the forward direction and a second one-way clutch unit (74) that permits transmission of a rotational drive force from the second shaft (66) to the second power transmitting mechanism (70) only when the second shaft (66) rotates in the opposite direction. The planetary gear mechanism (30) combines a rotational drive force transmitted from the first shaft (26) and a rotational drive force transmitted from the first power transmitting mechanism (68) and transmits the combined rotational drive force to the drive shaft (32) with a rotational speed increased.

The numerals in parentheses are given in accordance with the numerals in the accompanying drawings for facilitation of understanding of the present invention, and the present invention should not be interpreted as being limited by the elements given these numerals.

According to an embodiment of the present invention, a clutch means (58) is provided on a power transmission path between the first one-way clutch unit (72) and the planetary gear mechanism (30). The clutch means (58) permits transmission of a rotational drive force from the second shaft (66) to the planetary gear mechanism (30) and blocks transmission of a rotational drive force from the planetary gear mechanism (30) to the second shaft (66).

According to an embodiment of the present invention, the planetary gear mechanism (30) has a sun gear (46) connected to the first shaft (26), a ring gear (50) to which a rotational drive force of the first power transmitting mechanism (68) is transmitted, a planetary gear (48) that meshes with each of the sun gear (46) and the ring gear (50), and a carrier (52) that rotatably supports the planetary gear (48) in such a state as to be coupled to the drive shaft (32).

According to an embodiment of the present invention, the second power transmitting mechanism (70) is configured by a chain or a belt wound around the second one-way clutch unit (74) and the carrier (52) or by a gear.

According to an embodiment of the present invention, for example when the first rotary electric machine is driven and the second rotary electric machine is stopped, the rotational drive force of the first shaft is transmitted to the drive shaft via the planetary gear mechanism. Thus, only the rotational drive force of the first shaft can be output to the drive shaft (first driving mode: ECO (Environmental Communication) drive mode).

Furthermore, for example when both the first rotary electric machine and the second rotary electric machine are driven and the second shaft is rotated in the forward direction, the rotational drive force of the first shaft is transmitted to the planetary gear mechanism and the rotational drive force of the second shaft is transmitted to the planetary gear mechanism via the first one-way clutch unit and the first power transmitting mechanism. At this time, the rotational drive force of the second shaft is not transmitted to the second power transmitting mechanism because the second one-way clutch unit is provided. In the planetary gear mechanism, the rotational drive force transmitted from the first shaft and the rotational drive force transmitted from the first power transmitting mechanism are combined to be transmitted to the drive shaft with the rotational speed increased. This can make the rotational speed of the drive shaft higher than that in the first driving mode (second driving mode: SPEED drive mode).

Moreover, for example when both the first rotary electric machine and the second rotary electric machine are driven and the second shaft is rotated in the opposite direction, the rotational drive force of the first shaft is transmitted to the drive shaft via the planetary gear mechanism and the rotational drive force of the second shaft is transmitted to the drive shaft via the second one-way clutch unit and the second power transmitting mechanism. At this time, the rotational drive force of the second shaft is not transmitted to the first power transmitting mechanism because the first one-way clutch unit is provided. In the drive shaft, the rotational drive force transmitted from the planetary gear mechanism and the rotational drive force transmitted from the second power transmitting mechanism are combined and the torque is increased. This can make the torque of the drive shaft higher than that in the first driving mode (third driving mode: POWER drive mode).

In this manner, plural driving modes can be easily switched with a simple configuration. Thus, in a wide driving region, the first rotary electric machine and the second rotary electric machine can be driven in an efficient range. Furthermore, engagement/disengagement of the clutch does not need to be controlled in the switching of the driving mode, which can eliminate the need for a complicated mechanism and control.

According to an embodiment of the present invention, the clutch means that permits transmission of a rotational drive force from the second shaft to the planetary gear mechanism and blocks transmission of a rotational drive force from the planetary gear mechanism to the second shaft is provided on the power transmission path between the first one-way clutch unit and the planetary gear mechanism. Due to this feature, for example in the first driving mode, the rotational drive force transmitted from the first shaft to the planetary gear mechanism can be blocked from being transmitted to the second shaft. Thus, the rotational drive force of the first shaft can be efficiently transmitted to the drive shaft.

According to an embodiment of the present invention, in the planetary gear mechanism, the sun gear is connected to the first shaft and the carrier that rotatably supports the planetary gear is connected to the drive shaft. Furthermore, the rotational drive force of the first power transmitting mechanism is transmitted to the ring gear. Due to this feature, the rotational drive force transmitted from the first shaft to the sun gear and the rotational drive force transmitted from the first power transmitting mechanism to the ring gear can be combined by the planetary gear and be transmitted to the carrier with the rotational speed increased.

According to an embodiment of the present invention, the second power transmitting mechanism is configured by a chain or a belt wound around the second one-way clutch unit and the carrier or by a gear. Thus, the rotational drive force of the second shaft can be efficiently transmitted to the carrier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention is devised in view of such a problem. An object of an embodiment of the present invention is to eliminate the need for a complicated mechanism and control in a vehicle energy regenerating device having a first rotary electric machine and a second rotary electric machine and provide a vehicle energy regenerating device capable of causing only the first rotary electric machine to function as an electric generator with a simple configuration.

According to an embodiment of the present invention, a vehicle energy regenerating device (21) converts a rotational drive force of a drive shaft (32) to electric energy. The vehicle energy regenerating device (21) includes a first rotary electric machine (24) having a first rotor (38); a second rotary electric machine (64) having a second rotor (78); a first shaft (26) that rotates in conjunction with the first rotor (38); a second shaft (66) that rotates in conjunction with the second rotor (78); a planetary gear mechanism (30) capable of transmitting a rotational drive force between the drive shaft (32) and the first shaft (26); a power transmitting mechanism (68) capable of transmitting a rotational drive force between the second shaft (66) and the planetary gear mechanism (30); clutch means (58) for permitting transmission of a rotational drive force from the second shaft (66) to the planetary gear mechanism (30) and for blocking transmission of a rotational drive force from the planetary gear mechanism (30) to the second shaft (66); and a one-way clutch unit (72) for transmitting a rotational drive force of the second shaft (66) to the power transmitting mechanism (68) and locks motion of the power transmitting mechanism (68) in a blocking transmission of a rotational drive force from the planetary gear mechanism (30) to the second shaft (66) by the clutch means (58). If only the first rotary electric machine (24) is driven, a rotational drive force of the first rotor (38) is transmitted to the drive shaft (32) via the first shaft (26) and the planetary gear mechanism (30). If both the first rotary electric machine (24) and the second rotary electric machine (64) are driven, a rotational drive force transmitted from the first rotor (38) to the first shaft (26) and a rotational drive force transmitted from the second rotor (78) to the power transmitting mechanism (68) via the second shaft (66) and the one-way clutch unit (72) are combined by the planetary gear mechanism (30) to be transmitted to the drive shaft (32) with a rotational speed increased. If the drive shaft (32) is rotated, a rotational drive force transmitted from the drive shaft (32) to the planetary gear mechanism (30) is transmitted to the first rotor (38) via the first shaft (26) without being transmitted to the power transmitting mechanism (68) by the action of the one-way clutch unit (72) and the clutch means (58), to perform regeneration.

According to an embodiment of the present invention, the planetary gear mechanism (30) has a sun gear (46) connected to the first shaft (26), a ring gear (50) to and from which a rotational drive force is transmitted from and to the power transmitting mechanism (68), a planetary gear (48) that meshes with each of the sun gear (46) and the ring gear (50), and a carrier (52) that rotatably supports the planetary gear (48) in such a state so as to be coupled to the drive shaft (32). The clutch means (58) is provided for the ring gear (50).

According to an embodiment of the present invention, the ring gear (50) has a first ring gear (54) that engages with the power transmitting mechanism (68) and a second ring gear (56) that meshes with the planetary gear (48). The clutch means (58) has a first connection shaft (102) connected to the first ring gear (54) and a second connection shaft (104) that is provided coaxially with the first connection shaft (102) and is connected to the second ring gear (56). An outer ring member (106) surrounds one end part of the second connection shaft (104) with a plurality of first engaging members (110) connected to the first connection shaft (102) and being disposed at predetermined intervals along circumferential direction of the second connection shaft (104) between the second connection shaft (104) and the outer ring member (106). A pair of rollers (122) are disposed between the first engaging members (110) adjacent to each other. A cam surface (114b) is formed in an outer circumferential surface of one end part of the second connection shaft (104) and is in contact with the pair of rollers (122) to press the pair of rollers (122) against an inner circumferential surface of the outer ring member (106) and fix the pair of rollers (122) by a wedge action. An elastic member (124) is disposed between the pair of rollers (122) and biases the rollers (122) toward the cam surface (114b). A recess (120) is formed in one end surface of the second connection shaft (104) with a plurality of second engaging members (112) inserted into the recess (120) in such a state so as to be fixed to the other end surface of the first connection shaft (102).

According to an embodiment of the present invention, the power transmitting mechanism (68) has an annular gear (82) bonded to an outer circumferential surface of the one-way clutch unit (72), a first idle gear (84) that meshes with the annular gear (82), and a second idle gear (86) that meshes with the first idle gear (84) and the ring gear (50).

According to an embodiment of the present invention, a vehicle energy regenerating device (21) converts a rotational drive force of a drive shaft (32) to electric energy. The vehicle energy regenerating device (21) includes a first rotary electric machine (24) having a first rotor (38); a second rotary electric machine (64) having a second rotor (78); a first shaft (26) that rotates in conjunction with the first rotor (38); a second shaft (66) that rotates in conjunction with the second rotor (78); a planetary gear mechanism (30) capable of transmitting a rotational drive force between the drive shaft (32) and the first shaft (26); a power transmitting mechanism (68) capable of transmitting a rotational drive force between the second shaft (66) and the planetary gear mechanism (30); and clutch means (58) that permits transmission of a rotational drive force from the second shaft (66) to the planetary gear mechanism (30) and blocks transmission of a rotational drive force from the planetary gear mechanism (30) to the second shaft (66). If only the first rotary electric machine (24) is driven, a rotational drive force of the first rotor (38) is transmitted to the drive shaft (32) via the first shaft (26) and the planetary gear mechanism (30). If both the first rotary electric machine (24) and the second rotary electric machine (64) are driven, a rotational drive force transmitted from the first rotor (38) to the first shaft (26) and a rotational drive force transmitted from the second rotor (78) to the power transmitting mechanism (68) via the second shaft (66) and a one-way clutch unit (72) are combined by the planetary gear mechanism (30) to be transmitted to the drive shaft (32) with a rotational speed increased. If the drive shaft (32) is rotated, a rotational drive force transmitted from the drive shaft (32) to the planetary gear mechanism (30) is transmitted to the first rotor (38) via the first shaft (26) without being transmitted to the power transmitting mechanism (68) by action of the clutch means (58), to perform regeneration.

According to an embodiment of the present invention, the one-way clutch unit is provided that locks the motion of the power transmitting mechanism in blocking transmission of a rotational drive force from the planetary gear mechanism to the second shaft by the clutch means. Thus, the rotational drive force of the drive shaft can be transmitted to only the first shaft without being transmitted to the second shaft and regeneration can be performed by only the first rotary electric machine (regeneration mode).

Furthermore, for example when only the first rotary electric machine is driven, only the rotational drive force of the first rotor can be output to the drive shaft (first driving mode: ECO (Environmental Communication) drive mode). Moreover, for example when both the first rotary electric machine and the second rotary electric machine are driven and the second rotor is rotated, the rotational speed of the drive shaft can be made higher than that in the first driving mode (second driving mode: SPEED drive mode).

In this manner, even in the vehicle energy regenerating device that is so configured that both the first rotary electric machine and the second rotary electric machine can be driven as a motor, only the first rotary electric machine can be made to function as an electric generator with a simple configuration. Furthermore, engagement/disengagement of the clutch also does not need to be controlled in energy regeneration and therefore the need for complicated configuration and control can be eliminated.

According to an embodiment of the present invention, the clutch means is provided for the ring gear configuring the planetary gear mechanism and thus the rotational drive force of the drive shaft can be blocked from being transmitted to the power transmitting mechanism. This can enhance the electric power generation efficiency of the first rotary electric machine.

According to an embodiment of the present invention, the pair of rollers are biased toward the cam surface by the elastic member and thus the pair of rollers can be brought into contact with the cam surface in the state in which the first ring gear and the second ring gear are stationary. Due to this feature, the pair of rollers is fixed by wedge action of the cam surface of the second connection shaft connected to the second ring gear and the inner circumferential surface of the outer ring member. Thus, the rotation of the second ring gear can be blocked with the rotation of the first ring gear stopped.

On the other hand, when the first ring gear rotates, the first connection shaft connected to the first ring gear, the first engaging member, and the second engaging member integrally rotate. Thereby, the pair of rollers pressed along the circumferential direction of the second connection shaft by the first engaging member and the second connection shaft pressed along the circumferential direction by the second engaging member integrally rotate. Thus, the second ring gear connected to the second connection shaft can be rotated.

According to an embodiment of the present invention, the annular gear is bonded to the outer circumferential surface of the one-way clutch unit and the first idle gear and the second idle gear are provided. This can make the rotation directions of the one-way clutch unit and the ring gear opposite to each other. Due to this feature, with a simple configuration, the motion of the annular gear, the first idle gear, the second idle gear, and the ring gear can be locked in the regeneration mode. Furthermore, in the second driving mode, the rotational drive force of the second shaft can be transmitted to the ring gear via the one-way clutch unit, the annular gear, the first idle gear, and the second idle gear.

According to an embodiment of the present invention, the clutch means is provided that permits transmission of a rotational drive force from the second shaft to the planetary gear mechanism and blocks transmission of a rotational drive force from the planetary gear mechanism to the second shaft. Due to this feature, the rotational drive force of the drive shaft can be transmitted to only the first shaft without being transmitted to the second shaft and regeneration can be performed by only the first rotary electric machine.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
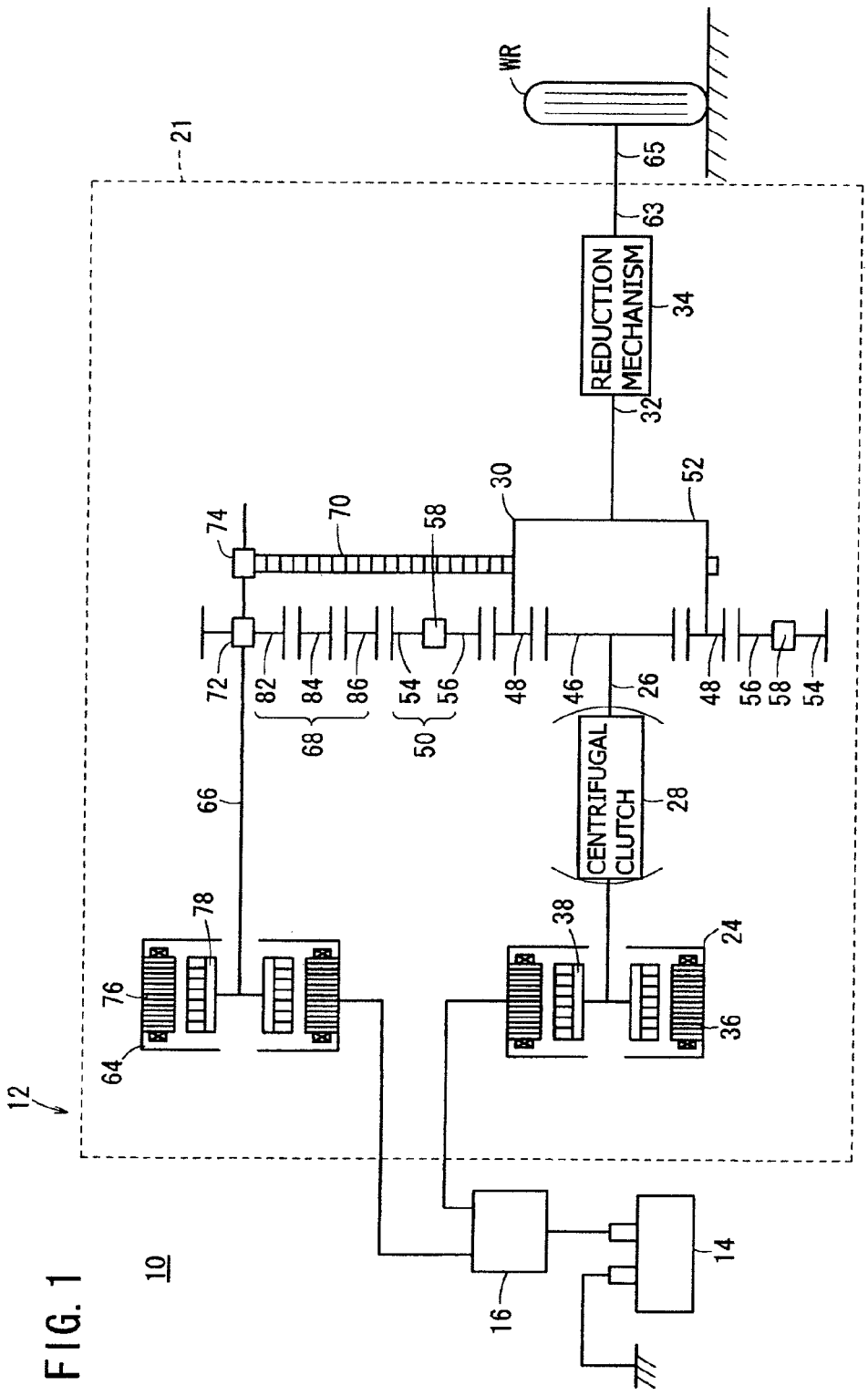
FIG. 1 is a schematic configuration diagram of a two-wheeled electric vehicle including a power output device according to the present invention.

Preferred embodiments will be exemplified below about a vehicle power output device (hereinafter, referred to as the power transmitting device) according to the present invention and will be described in detail below with reference to the accompanying drawings. In the following description, the clockwise direction (forward direction) and the counterclockwise direction (opposite direction) refer to directions when viewed from the vehicle body outside (vehicle body left side) in the vehicle width direction.

A power transmitting device 21 of the present embodiment is incorporated in a two-wheeled electric vehicle 10. It selectively outputs the rotational drive force of a first rotary electric machine 24 and the rotational drive force of a second rotary electric machine 64 to a rear wheel WR and meanwhile converts the rotational drive force of the rear wheel WR to electric energy by the first rotary electric machine 24 to charge (recover) it in a battery 14.

As shown in FIG. 1, the two-wheeled electric vehicle 10 includes a swing unit 12 that is provided so as to be freely swingable relative to the vehicle body frame (not shown) and rotatably supports the rear wheel WR as the driving wheel, the battery 14, and a control section 16.

Figure 2:
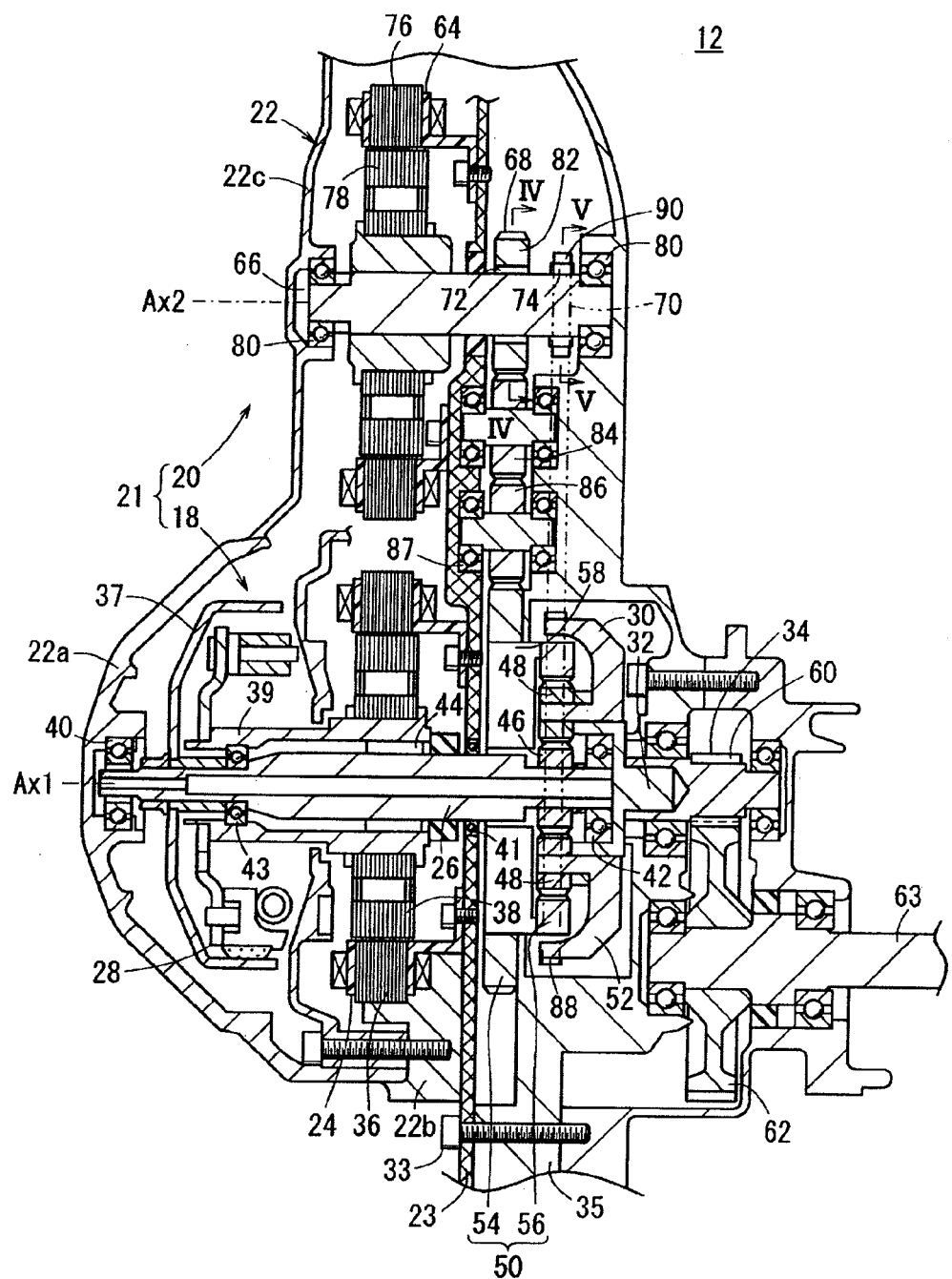
FIG. 2 is a longitudinal sectional view of a swing unit shown in FIG. 1.

As shown in FIG. 2, the swing unit 12 has the power transmitting device (energy regenerating device) 21 including a first mechanism 18 and a second mechanism 20 located on the vehicle body front side of the first mechanism 18, and a cover member 22 surrounding the first mechanism 18 and the second mechanism 20.

The first mechanism 18 includes the first rotary electric machine 24 as the drive source, a first shaft 26 that extends along the vehicle width direction and is rotated by driving of the first rotary electric machine 24, and a centrifugal clutch 28 provided on one end side of the first shaft 26. The first mechanism 18 further includes a planetary gear mechanism 30 connected to the other end side of the first shaft 26, a drive shaft 32 connected to the planetary gear mechanism 30, and a reduction mechanism 34 connected to the drive shaft 32.

The first rotary electric machine 24 includes an annular first stator 36 fixed to a partition 23 attached to a support member 35 that supports the reduction mechanism 34 by a bolt 33, and a hollow first rotor 38 disposed in the center hole of the first stator 36. The battery 14 is electrically connected to the first stator 36 via the control section 16 (see FIG. 1). The control section 16 performs switching of the connection between the battery 14 and the first stator 36 to control the applied current to thereby allow the first rotary electric machine 24 to function as a motor or an electric generator.

The first rotor 38 extends to a position closer to the outside in the vehicle width direction (left side in FIG. 2) than the first stator 36. An inner housing 37 of the centrifugal clutch 28 is provided at one end part of a fixer 39 of the first rotor 38. More specifically, the centrifugal clutch 28 is located closer to the outside in the vehicle width direction than the first rotary electric machine 24.

The centrifugal clutch 28 connects and disconnects the first rotor 38 and the first shaft 26 depending on the rotational speed of the first rotor 38. In other words, the centrifugal clutch 28 connects the first rotor 38 and the first shaft 26 only when the rotational speed of the first rotor 38 surpasses a predetermined rotational speed. This can favorably suppress the situation in which overload is applied to the first rotary electric machine 24 in vehicle takeoff with a simple structure.

The first shaft 26 is inserted in the inside of the first rotor 38. The first shaft 26 is rotatably supported by a plurality of bearings 40, 41, and 42. The bearing 40 is located at one end part of the first shaft 26 and bonded to the cover member 22. The bearing 41 is located at substantially the center part of the first shaft 26 and bonded to the partition 23. The bearing 42 is located at the other end part of the first shaft 26 and bonded to the drive shaft 32.

A bearing 43 and a roller bearing 44 are provided in the gap between the inner circumferential surface of the first rotor 38 and the outer circumferential surface of the first shaft 26. This allows the first rotor 38 of the first rotary electric machine 24 to be freely rotatably supported relative to the first shaft 26.

Figure 3:
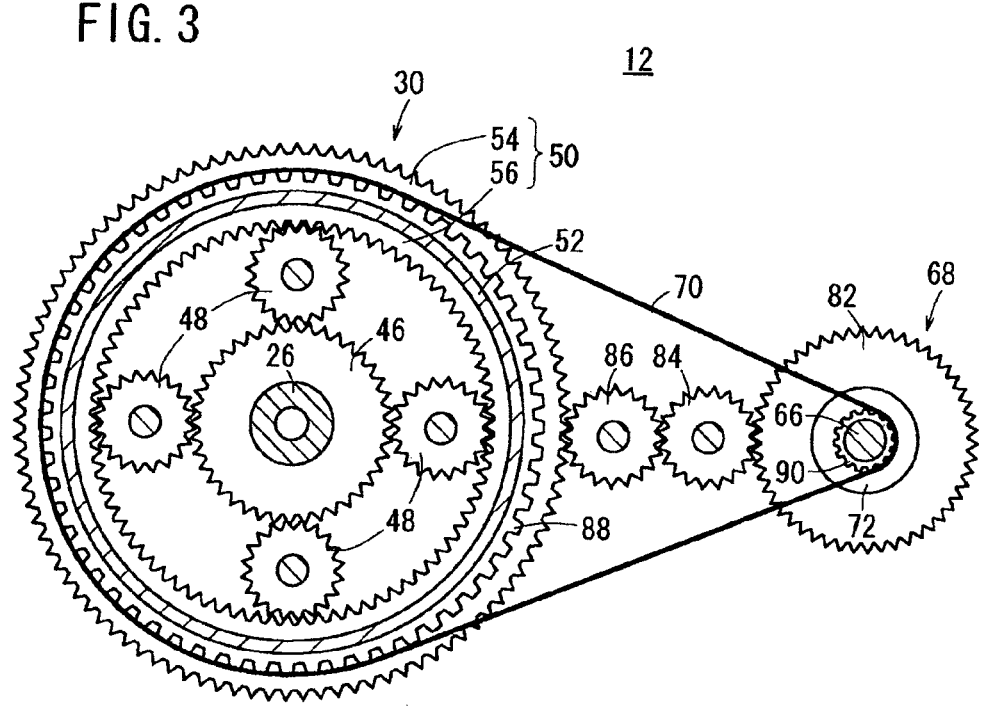
FIG. 3 is a partially sectional side view for explaining the configuration of a planetary gear mechanism, a first power transmitting mechanism, and a second power transmitting mechanism shown in FIG. 2.

As shown in FIG. 3, the planetary gear mechanism 30 includes a sun gear 46 bonded to the outer circumferential surface of the first shaft 26 on the other end side of the first shaft 26 and a plurality of (e.g. four) planetary gears 48 that mesh with the sun gear 46. The planetary gear mechanism 30 further includes an annular ring gear 50 that meshes with the respective planetary gears 48 and a carrier 52 (see FIG. 2) that rotatably supports the plural planetary gears 48.

The sun gear 46 and the respective planetary gears 48 are configured as external tooth gears. The respective planetary gears 48 rotate and can revolve around the sun gear 46. The ring gear 50 has an outside ring gear (first ring gear) 54 having external teeth formed on the outer circumferential surface of the ring gear 50 and an inside ring gear (second ring gear) 56 having internal teeth formed on the inner circumferential surface of the ring gear 50.

As is understood from FIG. 2, the outside ring gear 54 is located closer to the outside in the vehicle width direction than the inside ring gear 56. The outside ring gear 54 is connected to the inside ring gear 56 via a clutch mechanism (clutch means) 58. The detailed structure of this clutch mechanism 58 will be described later.

The carrier 52 is located closer to the inside in the vehicle width direction (right side in FIG. 2) than the respective planetary gears 48. The carrier 52 is formed into an annular shape and its outside rim is bent toward the outside in the vehicle width direction. More specifically, the outside rim of the carrier 52 surrounds the inside ring gear 56 from the outside in its radial direction.

The planetary gear mechanism 30 configured in this manner combines a rotational drive force input from the sun gear 46 and a rotational drive force input from the ring gear 50 and transmits the combined rotational drive force to the carrier 52 with the rotational speed increased.

The drive shaft 32 is fitted into the center hole of the carrier 52. More specifically, the drive shaft 32 is coupled to the carrier 52 and thus rotates integrally with the carrier 52. The reduction mechanism 34 includes a first reduction gear unit 60 connected to the other end part of the drive shaft 32 and a second reduction gear unit 62 that meshes with the first reduction gear unit 60. An axle 65 that rotatably supports the rear wheel WR is coupled to a shaft 63 configuring the second reduction gear unit 62 (see FIG. 1).

The second mechanism 20 has the second rotary electric machine 64 as an auxiliary drive source, a second shaft 66 that extends along the vehicle width direction and rotates by driving of the second rotary electric machine 64, and a first power transmitting mechanism 68 that transmits the rotational drive force of the second shaft 66 to the outside ring gear 54 of the planetary gear mechanism 30. The second mechanism 20 further has a second power transmitting mechanism 70 that transmits the rotational drive force of the second shaft 66 to the carrier 52 of the planetary gear mechanism 30 and a first one-way clutch unit 72 and a second one-way clutch unit 74 that are provided for the second shaft 66.

The second rotary electric machine 64 is configured similarly to the above-described first rotary electric machine 24. More specifically, the second rotary electric machine 64 includes an annular second stator 76 fixed to the partition 23 of the cover member 22 and a hollow second rotor 78 disposed in the center hole of the second stator 76. The battery 14 is electrically connected to the second stator 76 via the control section 16 (see FIG. 1). The second rotor 78 can rotate in both forward and opposite directions.

The control section 16 performs switching of the connection between the battery 14 and the second stator 76 to control the applied current to thereby allow the second rotary electric machine 64 to function as a motor.

The second shaft 66 is rotatably supported by a pair of bearings 80 bonded to the cover member 22 in such a state as to be fitted into the center hole of the second rotor 78. More specifically, the second shaft 66 and the second rotor 78 are integrally rotate.

As shown in FIG. 2 and FIG. 3, the first power transmitting mechanism 68 includes an annular-shape gear (annular gear) 82 provided on the first one-way clutch unit 72, an idle gear (first idle gear) 84 that meshes with the gear 82, and an idle gear (second idle gear) 86 that meshes with the idle gear 84 and the outside ring gear 54.

The gear 82 and the idle gears 84 and 86 are arranged on one row along the vehicle anteroposterior direction. The respective idle gears 84 and 86 have the same configuration and are freely rotatably supported by a plurality of bearings 87 bonded to the cover member 22 (see FIG. 2).

The second power transmitting mechanism 70 is configured by a chain and is wound around an annular first sprocket 88 bonded to the outside rim of the carrier 52 and an annular second sprocket 90 (see FIG. 5) bonded to the second one-way clutch unit 74. Due to this feature, the rotational drive force of the second shaft 66 can be transmitted to the carrier 52 directly and efficiently and the swing unit 12 can be simplified. The second power transmitting mechanism 70 may be configured by a vee belt, a plurality of teeth, etc.

As is understood from FIG. 2, the sun gear 46, the plurality of planetary gears 48, and the inside ring gear 56 are disposed between the first sprocket 88 and the second sprocket 90, around which the second power transmitting mechanism 70 is wound. This can decrease the size of the swing unit 12 in the vehicle width direction. Thus, the thickness of the swing unit 12 can be decreased.

Figure 4:
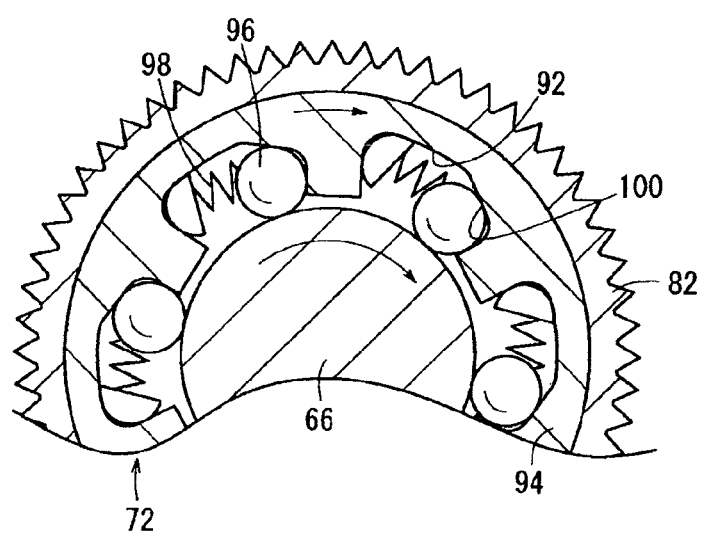
FIG. 4 is a partially omitted sectional view along line IV-IV in FIG. 2.

As shown in FIG. 4, the first one-way clutch unit 72 has a ring body 94 that is disposed so as to surround the outer circumferential surface of the second shaft 66. In the inner circumferential surface of the ring body 94, a plurality of trenches 92 having a circular arc sectional shape are formed along the circumferential direction. The first one-way clutch unit 72 further has roller bearings 96 and elastic members 98 that are provided in the respective trenches 92 formed in the ring body 94.

The inner circumferential surface of the gear 82 is bonded to the outer circumferential surface of the ring body 94. In each trench 92, a cam surface 100 inclined toward the inside in the radial direction of the second shaft 66 along with the clockwise direction is formed.

Each roller bearing 96 is formed into a columnar shape. The elastic member 98 is provided on the opposite side in the trench 92 to the side on which the cam surface 100 is formed and biases the roller bearing 96 toward the cam surface 100. As the elastic member 98, a plate spring, a coil spring, etc. can be used.

In the first one-way clutch unit 72 configured in this manner, the roller bearing 96 is biased toward the cam surface 100 by the elastic member 98 and therefore the roller bearing 96 is in contact with the cam surface 100 in the state in which the second shaft 66 and the ring body 94 are stationary. More specifically, the roller bearing 96 is fixed between the cam surface 100 and the outer circumferential surface of the second shaft 66 by wedge action.

When the second shaft 66 rotates in the clockwise direction, the ring body 94 rotates in the clockwise direction with the wedge action kept. When the second shaft 66 rotates in the anticlockwise direction, the roller bearing 96 gets away from the cam surface 100 and thus the second shaft 66 idly rotates with respect to the ring body 94.

More specifically, the first one-way clutch unit 72 transmits the rotational drive force of the second shaft 66 to the first power transmitting mechanism 68 only when the second shaft 66 rotates in the clockwise direction.

Figure 5:
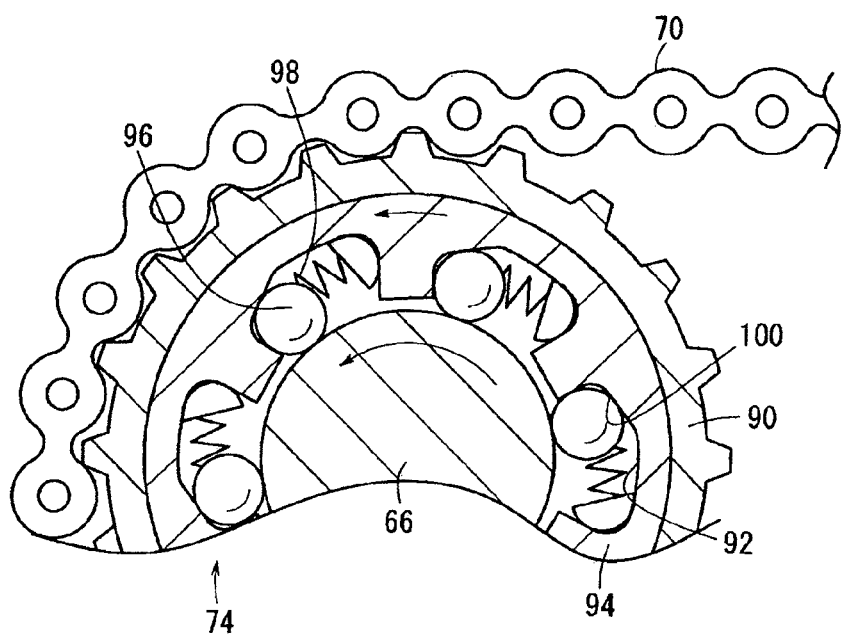
FIG. 5 is a partially omitted sectional view along line V-V in FIG. 2.

As shown in FIG. 5, the second one-way clutch unit 74 is equivalent to the object obtained by attaching the above-described first one-way clutch unit 72 to the second shaft 66 in such a manner that the first one-way clutch unit 72 is inverted by 180° about a line perpendicular to the axis line direction of the first one-way clutch unit 72.

More specifically, the second one-way clutch unit 74 and the first one-way clutch unit 72 have the same configuration. Therefore, in the second one-way clutch unit 74, the same constituent element as that in the first one-way clutch unit 72 is given the same reference numeral and detailed description thereof is omitted. As is understood from FIG. 5, the inner circumferential surface of the above-described annular second sprocket 90 is bonded to the outer circumferential surface of the ring body 94 configuring the second one-way clutch unit 74.

According to such a second one-way clutch unit 74, when the second shaft 66 rotates in the anticlockwise direction, the second shaft 66 and the ring body 94 integrally rotate in the counterclockwise direction. When the second shaft 66 rotates in the clockwise direction, the second shaft 66 idly rotates with respect to the ring body 94.

More specifically, the second one-way clutch unit 74 transmits the rotational drive force of the second shaft 66 to the second power transmitting mechanism 70 only when the second shaft 66 rotates in the counterclockwise direction.

Figure 6:
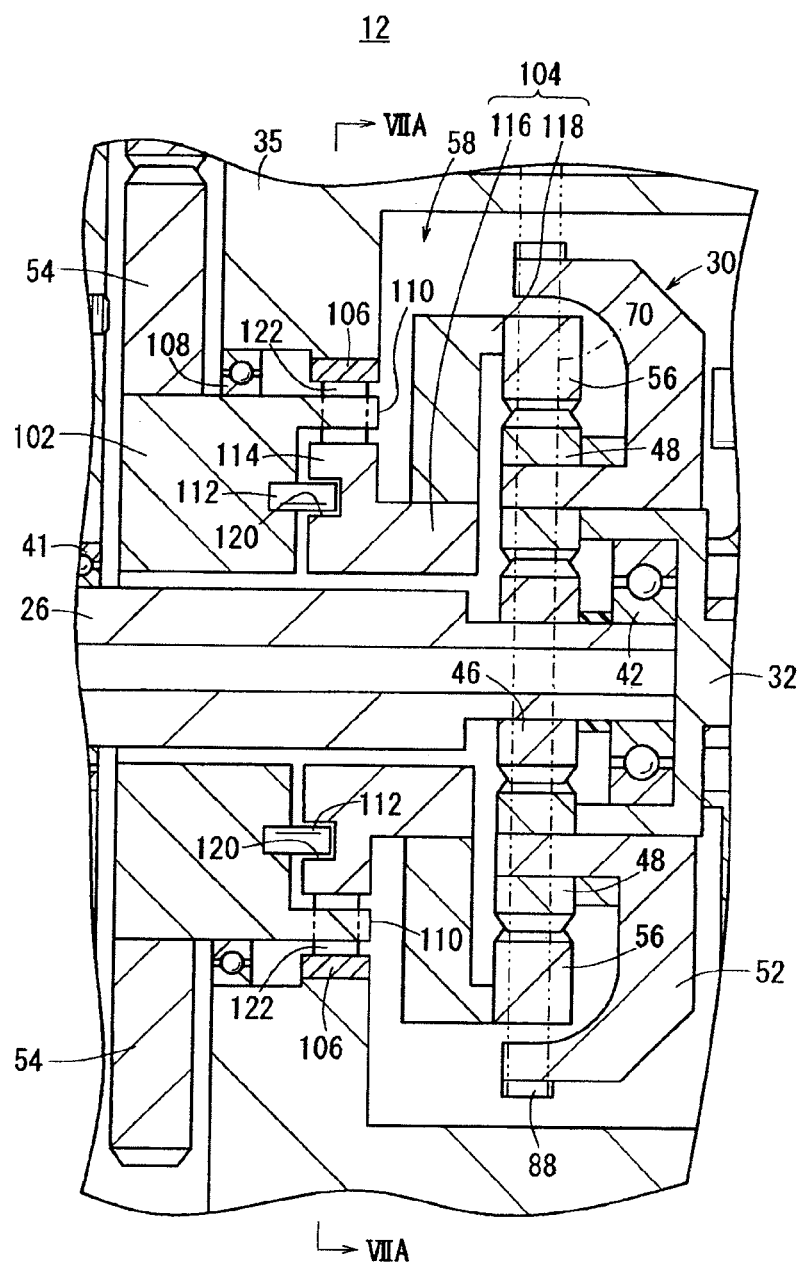
FIG. 6 is an enlarged sectional view of a clutch mechanism shown in FIG. 2.
Figure 7A:
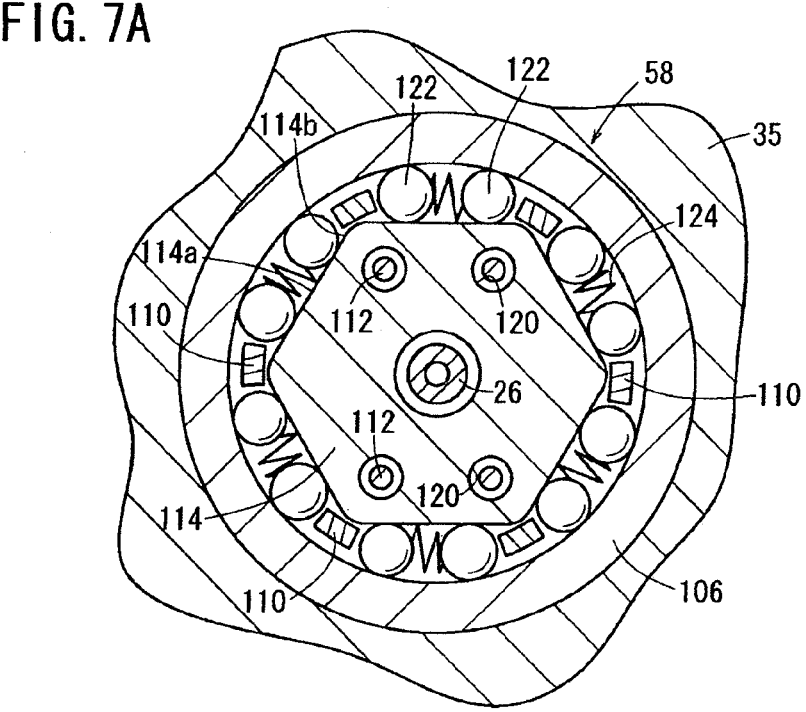
FIG. 7A is a sectional view along line VIIA-VIIA in FIG. 6.

As shown in FIG. 6 and FIG. 7A, the clutch mechanism 58 has a hollow outside connection shaft (first connection shaft) 102 to which the inner circumferential surface of the outside ring gear 54 is bonded, an inside connection shaft (second connection shaft) 104 provided coaxially with the outside connection shaft 102, and an outer ring member 106 that is bonded to the support member 35 and surrounds one end part of the inside connection shaft 104.

The outside connection shaft 102 is rotatably supported by a bearing 108 bonded to the support member 35. To the outer rim of the other end surface of the outside connection shaft 102, a plurality of first engaging members 110 disposed at predetermined intervals along the circumferential direction of the outside connection shaft 102 between one end part of the inside connection shaft 104 and the outer ring member 106 are connected. Furthermore, in the other end surface of the outside connection shaft 102, one end part of each of the plurality of (e.g. four) second engaging members 112 formed into a columnar shape is buried.

The inside connection shaft 104 has a connection shaft main body 116 including a cam part 114 configuring one end part of the inside connection shaft 104 and a coupling member 118 that couples the connection shaft main body 116 to the inside ring gear 56. In one end surface of the cam part 114, a plurality of (four) recesses 120 into which the other end parts of the second engaging members 112 are inserted are formed. The outer circumference of the cam part 114 is formed so as to have a substantially hexagonal sectional shape.

Between the adjacent first engaging members 110, a pair of rollers 122 disposed on a flat surface 114a configuring the outside surface of the cam part 114 and an elastic member 124 disposed between these rollers 122 are provided. The elastic member 124 biases each roller 122 toward a cam surface 114b configuring the corner of the cam part 114. As the elastic member 124, e.g. a spring member such as a coil spring or a plate spring can be used.

In the clutch mechanism 58 configured in this manner, the pair of rollers 122 are biased toward the cam surface 114b by the elastic member 124 and thus the pair of rollers 122 can be brought into contact with the cam surface 114b in a state wherein the outside ring gear 54 and the inside ring gear 56 are stationary. Due to this feature, the pair of rollers 122 are fixed by wedge action of the cam surface 114b of the inside connection shaft 104 connected to the inside ring gear 56 and the inner circumferential surface of the outer ring member 106. Thus, the rotation of the inside ring gear 56 can be blocked with the outside ring gear 54 kept stationary.

Figure 7B:
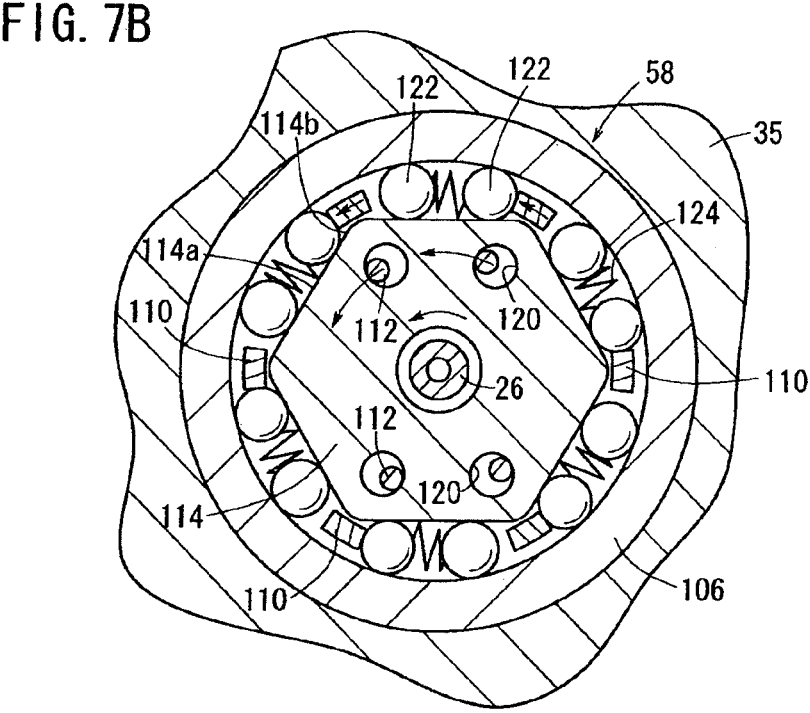
FIG. 7B is a sectional view for explaining the operation of the clutch mechanism when an outside ring gear is rotated in the anticlockwise direction.

On the other hand, as shown in FIG. 7B, for example when the outside ring gear 54 rotates in the counterclockwise direction, the outside connection shaft 102 connected to the outside ring gear 54, the first engaging members 110, and the second engaging members 112 integrally rotate. Thereby, the first engaging member 110 presses the pair of rollers 122 in the counterclockwise direction and the second engaging member 112 presses the wall surface configuring the recess 120 of the inside connection shaft 104 in the counterclockwise direction. As a result, the pair of rollers 122, the elastic member 124, and the inside connection shaft 104 integrally rotate in the counterclockwise direction.

More specifically, the clutch mechanism 58 permits transmission of a rotational drive force from the outside ring gear 54 to the inside ring gear 56 and can block transmission of a rotational drive force from the inside ring gear 56 to the outside ring gear 54.

As is understood from FIG. 2, the cover member 22 has a first cover 22a covering the first rotary electric machine 24, a second cover 22b provided on the partition 23 in such a manner as to be attached to the first cover 22a, and a third cover 22c that is attached to the first cover 22a and covers the second rotary electric machine 64. For the connection between the first cover 22a and the second cover 22b and the connection between the first cover 22a and the third cover 22c, a fixing member such as a bolt (not shown) may be used.

The control section 16 can accordingly select the following modes: a first driving mode with low speed and low drive force (ECO (Environmental Communication) drive mode); a second driving mode with high speed and low drive force (SPEED drive mode); a third driving mode with low speed and high drive force (POWER drive mode); and a regeneration mode in which the rotational drive force of the rear wheel WR is converted to electric energy to be charged (recovered) in the battery.

The first to third driving modes and the regeneration mode will be described below with reference to FIG. 8 to FIG. 12. In FIG. 8 to FIG. 10 and FIG. 12, the constituent elements indicated by the heavy line show the sites to which power (electric power) is transmitted. In addition, the solid arrow indicates the direction of power transmission and the dashed arrow indicates the direction of electric power transmission.

Figure 8:
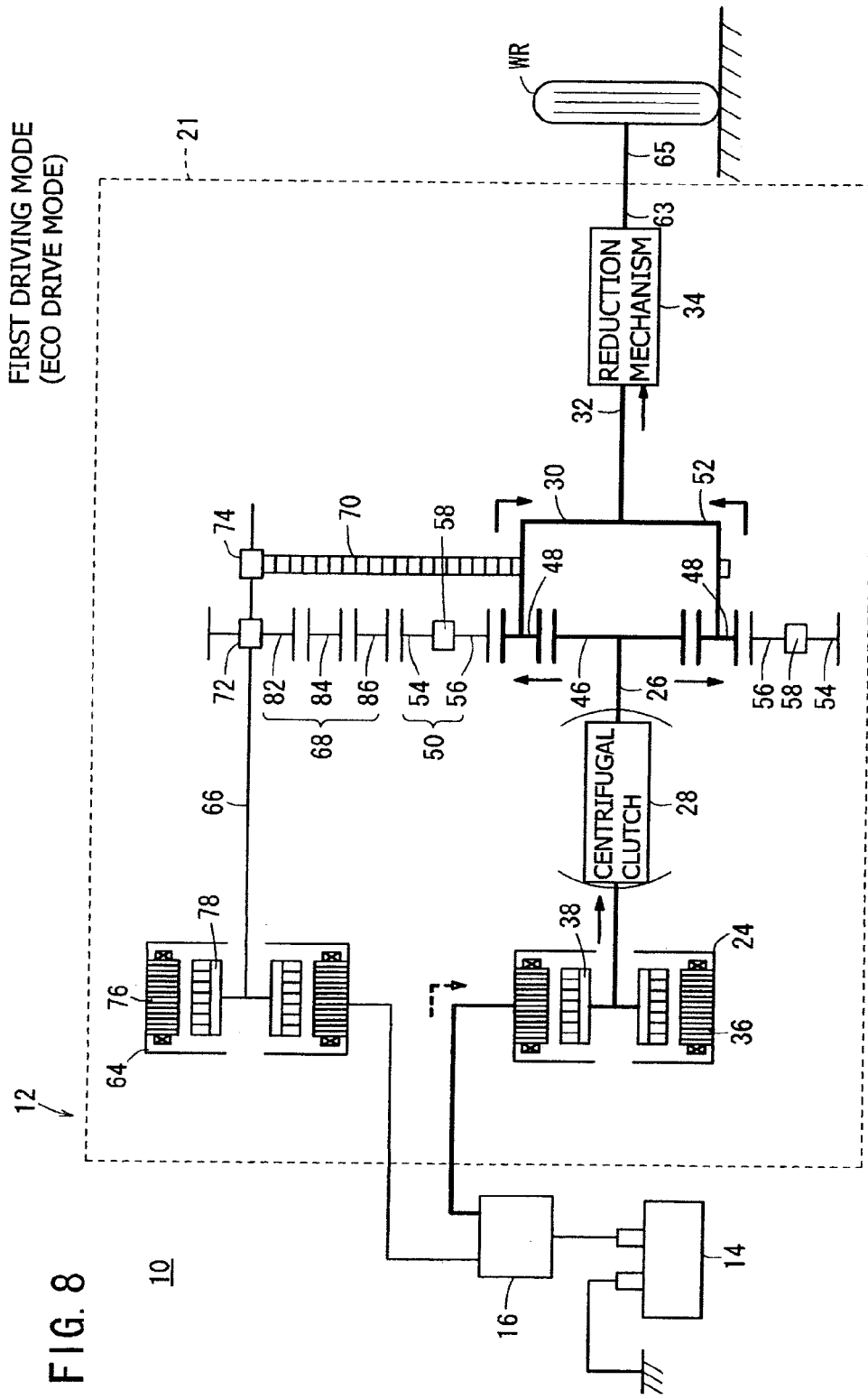
FIG. 8 is a schematic configuration diagram of the two-wheeled electric vehicle for explaining the flow of power when driving is performed in a first driving mode (ECO drive mode)

Referring first to FIG. 8, in the first driving mode, the control section 16 drives the first rotary electric machine 24 to rotate the first rotor 38 in the counterclockwise direction and stops the second rotary electric machine 64. Thereby, the first rotor 38 is connected to the first shaft 26 by the centrifugal clutch 28 when the rotational speed of the first rotor 38 reaches a predetermined rotational speed, so that the first shaft 26 rotates in the counterclockwise direction.

The rotational drive force of the first shaft 26 is transmitted to the drive shaft 32 via the sun gear 46, the plural planetary gears 48, and the carrier 52. At this time, the inside ring gear 56 is locked by the clutch mechanism 58 and thus the rotational drive force of the sun gear 46 is not transmitted to the outside ring gear 54 and so forth. Therefore, the rotational drive force of the first shaft 26 can be efficiently transmitted to the drive shaft 32.

The rotational drive force transmitted to the drive shaft 32 is transmitted to the rear wheel WR in the state in which the rotational speed is reduced (torque is increased) by the reduction mechanism 34. As a result, the rear wheel WR is rotated by only the rotational drive force of the first rotary electric machine 24. In this case, the efficient drive range of the first rotary electric machine 24 is the range shown in a graph of FIG. 11A (hatched area).

Figure 9:
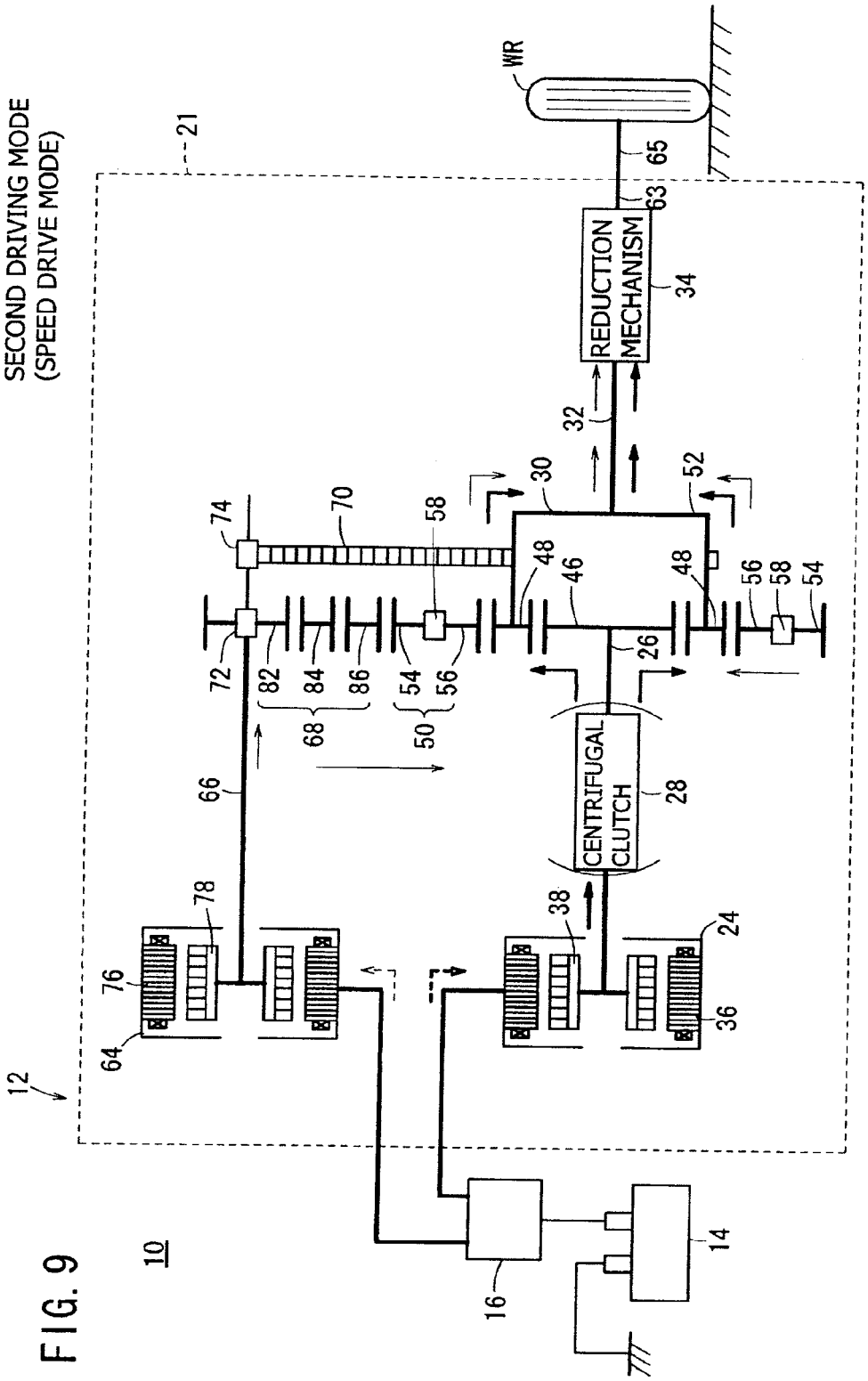
FIG. 9 is a schematic configuration diagram of the two-wheeled electric vehicle for explaining the flow of power when driving is performed in a second driving mode (SPEED drive mode)

Referring next to FIG. 9, in the second driving mode, the control section 16 drives both the first rotary electric machine 24 and the second rotary electric machine 64 to rotate the first rotor 38 in the counterclockwise direction and rotate the second rotor 78 in the clockwise direction. Thereby, the rotational drive force of the first rotor 38 is transmitted to the sun gear 46 via the centrifugal clutch 28 and the first shaft 26.

Meanwhile, the rotational drive force of the second rotor 78 is transmitted to the inside ring gear 56 via the second shaft 66, the first power transmitting mechanism 68 (gear 82 and the pair of idle gears 84 and 86), the outside ring gear 54, and the clutch mechanism 58. At this time, the rotational drive force of the second shaft 66 is not transmitted to the second power transmitting mechanism 70 because the second shaft 66 rotates in the clockwise direction.

The rotational drive force transmitted to the sun gear 46 and the rotational drive force transmitted to the inside ring gear 56 are combined by the plurality of planetary gears 48 to be transmitted to the drive shaft 32 via the carrier 52 with the rotational speed increased. The rotational drive force transmitted to the drive shaft 32 is transmitted to the rear wheel WR via the reduction mechanism 34. As a result, the rotational speed of the rear wheel WR is higher than that in the first driving mode. In this case, the efficient range of the first rotary electric machine 24 and the second rotary electric machine 64 is the range shown in a graph of FIG. 11B (hatched area).

Figure 10:
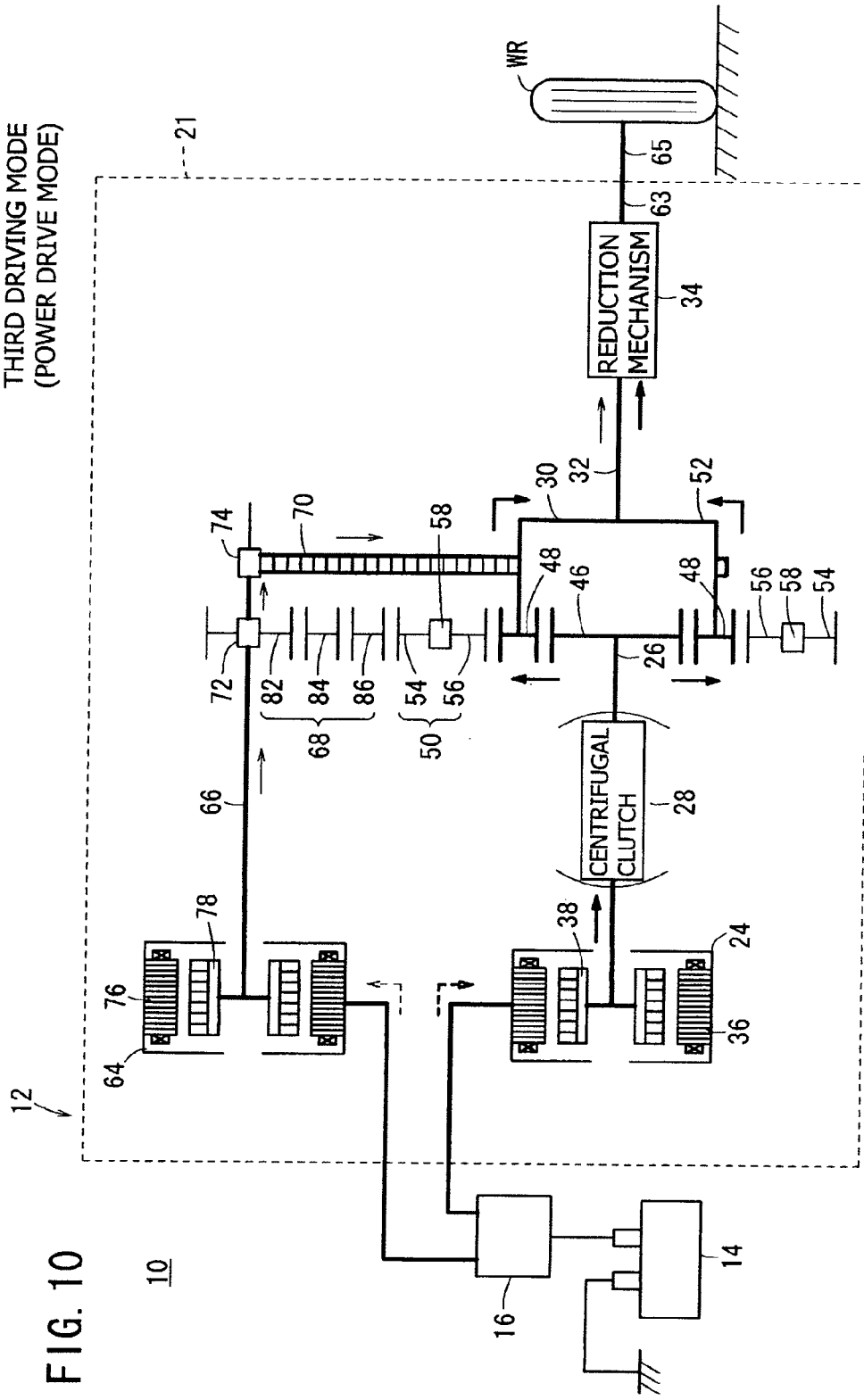
FIG. 10 is a schematic configuration diagram of the two-wheeled electric vehicle for explaining the flow of power when driving is performed in a third driving mode (POWER drive mode)
Figure 11A:
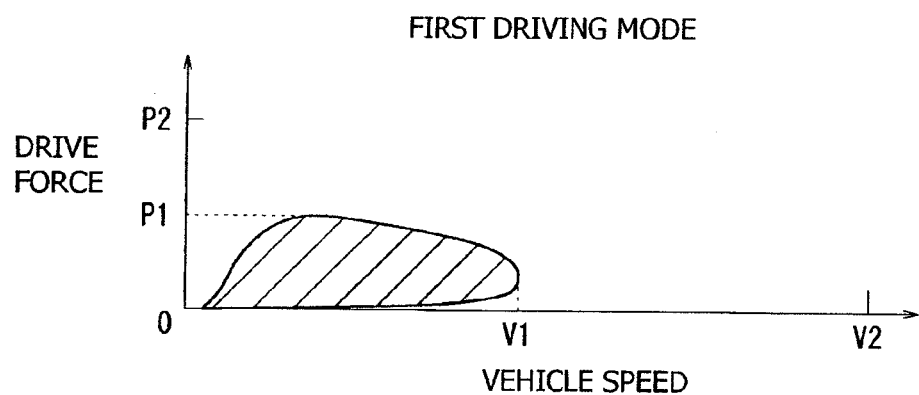
FIG. 11A is a graph showing the efficient driving region of a first rotary electric machine in the first driving mode.
Figure 11B:
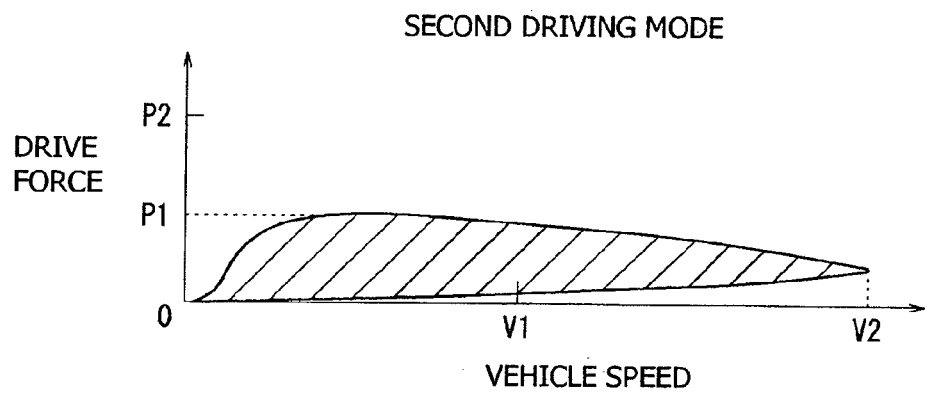
FIG. 11B is a graph showing the efficient driving region of the first rotary electric machine and a second rotary electric machine in the second driving mode.
Figure 11C:
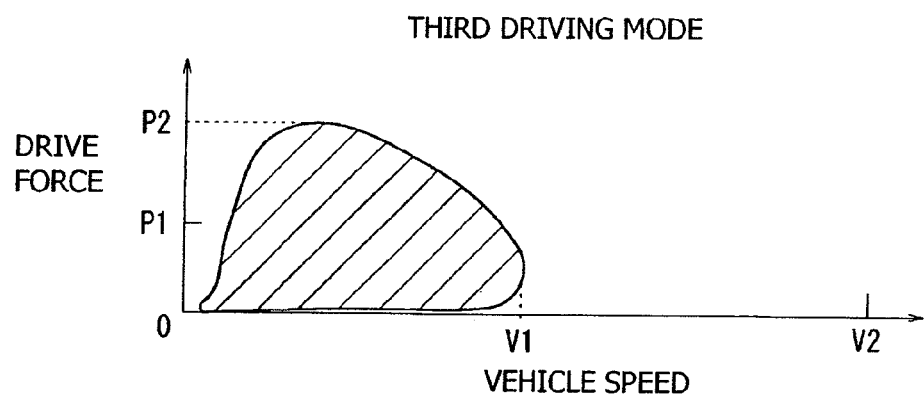
FIG. 11C is a graph showing the efficient driving region of the first rotary electric machine and the second rotary electric machine in the third driving mode.

Referring next to FIG. 10, in the third driving mode, the control section 16 drives both the first rotary electric machine 24 and the second rotary electric machine 64 to rotate the first rotor 38 and the second rotor 78 in the counterclockwise direction. Thereby, the rotational drive force of the first rotor 38 is transmitted to the plurality of planetary gears 48 via the centrifugal clutch 28, the first shaft 26, and the sun gear 46.

Meanwhile, the rotational drive force of the second rotor 78 is transmitted to the second shaft 66, the second one-way clutch unit 74, and the second power transmitting mechanism 70. At this time, the rotational drive force of the second shaft 66 is not transmitted to the first power transmitting mechanism 68 because the second shaft 66 rotates in the anticlockwise direction.

The rotational drive force transmitted to the plurality of planetary gears 48 and the rotational drive force transmitted to the second power transmitting mechanism 70 are combined by the carrier 52 to be transmitted to the drive shaft 32 with the torque increased. The rotational drive force transmitted to the drive shaft 32 is transmitted to the rear wheel WR via the reduction mechanism 34. As a result, the torque of the rear wheel WR is higher than that in the first driving mode. In this case, the efficient range of the first rotary electric machine 24 and the second rotary electric machine 64 is the range shown in a graph of FIG. 11C (hatched area).

As described above, in the present embodiment, a plurality of driving modes can be easily switched with a simple configuration. Thus, in a wide driving region, the first rotary electric machine and the second rotary electric machine can be driven in an efficient range. Furthermore, engagement/disengagement of the clutch does not need to be controlled in the switching of the driving mode, which can eliminate the need for a complicated mechanism and control.

Figure 12:
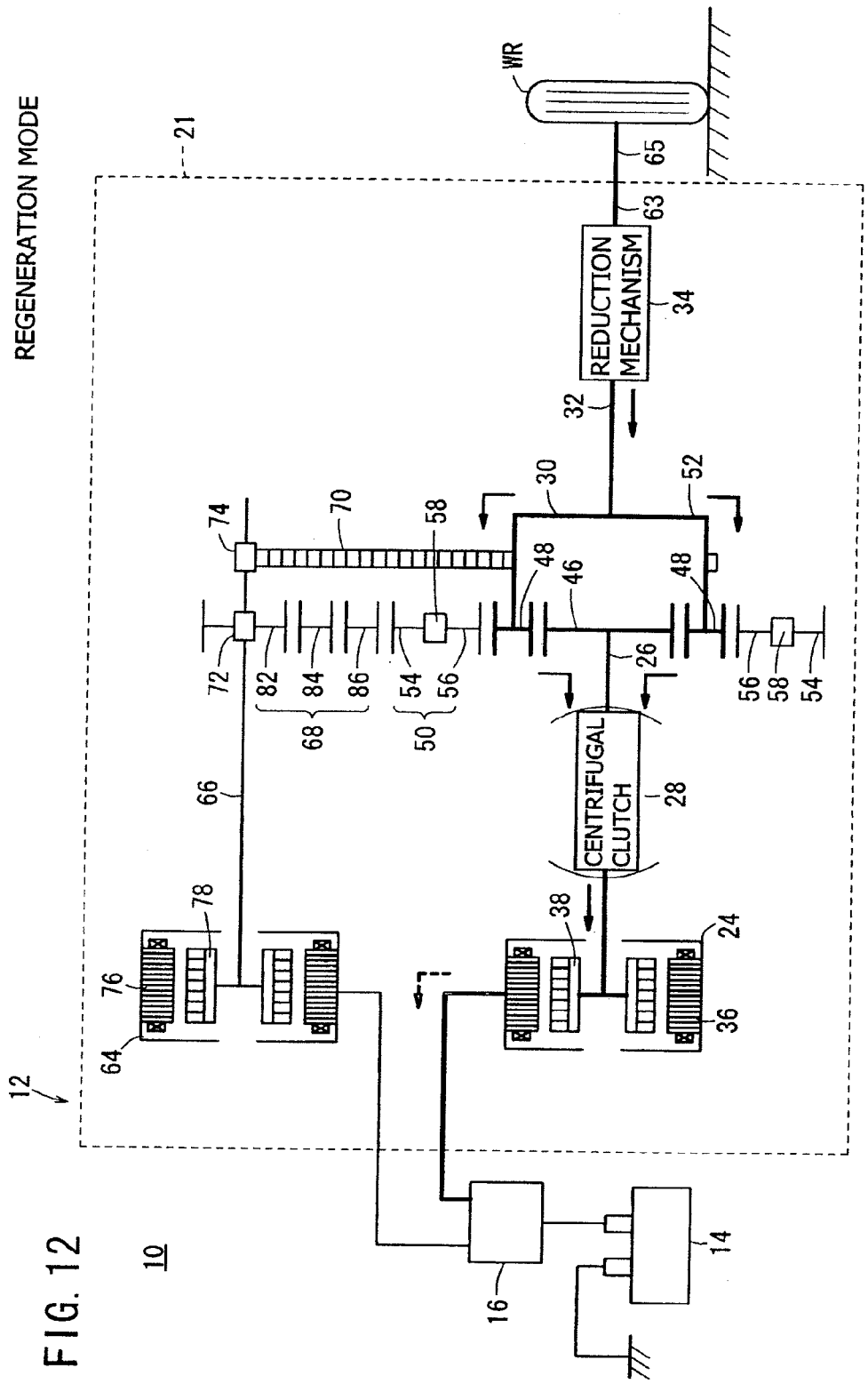
FIG. 12 is a schematic configuration diagram of the two-wheeled electric vehicle for explaining the flow of power in a regeneration mode.

Furthermore, as shown in FIG. 12, in the regeneration mode, when the rear wheel WR rotates in the counterclockwise direction, the rotational drive force of the rear wheel WR is transmitted to the carrier 52 via the reduction mechanism 34 and the drive shaft 32. In response to the rotation of the carrier 52, the second power transmitting mechanism 70 and the ring body 94 (see FIG. 5) configuring the second one-way clutch unit 74 also rotate in the counterclockwise direction. However, the rotational drive force of the ring body 94 is not transmitted to the second shaft 66. More specifically, the second power transmitting mechanism 70 idly rotates with respect to the second shaft 66. Therefore, the rotational drive force of the carrier 52 is efficiently transmitted to the plurality of planetary gears 48.

The rotational drive force transmitted to the plural planetary gears 48 is transmitted to the sun gear 46. At this time, the rotational drive force of the plurality of planetary gears 48 is not transmitted to the outside ring gear 54 because the inside ring gear 56 is locked by the action of the clutch mechanism 58.

In other words, at this time, the first one-way clutch unit 72 locks the motion of the first power transmitting mechanism 68 in blocking the transmission of the rotational drive force from the planetary gear mechanism 30 to the second shaft 66 by the clutch mechanism 58. More specifically, at this time, the counterclockwise-direction motion of the ring body 94 configuring the first one-way clutch unit 72 is locked by the roller bearings 96 (see FIG. 4). Thereby, the motion of the gear 82, the first idle gear 84, the second idle gear 86, and the outside ring gear 54 is locked. Therefore, the transmission of the rotational drive force from the planetary gear mechanism 30 to the second shaft 66 is blocked by the action of the clutch mechanism 58.

The rotational drive force transmitted to the sun gear 46 is transmitted to the first rotor 38 via the first shaft 26 and the centrifugal clutch 28. Thereby, electric power generated by the first stator 36 due to the rotation of the first rotor 38 can be charged in the battery 14.

According to the present embodiment, the clutch mechanism 58, which permits transmission of a rotational drive force from the second shaft 66 to the planetary gear mechanism 30 and whereas blocks transmission of a rotational drive force from the planetary gear mechanism 30 to the second shaft 66, is provided. Thus, the rotational drive force of the drive shaft 32 can be transmitted to only the first shaft 26 without being transmitted to the second shaft 66.

Therefore, even in the power transmitting device 21 having the first rotary electric machine 24 and the second rotary electric machine 64, only the first rotary electric machine 24 can be made to function as an electric generator with a simple configuration. Furthermore, engagement/disengagement of the clutch also does not need to be controlled in energy regeneration. This can eliminate the need for a complicated control.

Furthermore, because the clutch mechanism 58 is provided for the ring gear 50 configuring the planetary gear mechanism 30, it is possible to block transmission of the rotational drive force of the drive shaft 32 to the first power transmitting mechanism 68. This enables regeneration in the first rotary electric machine 24.

More specifically, even in the power transmitting device 21, which is configured so that both the first rotary electric machine 24 and the second rotary electric machine 64 can be driven as a motor, only the first rotary electric machine 24 can be made to function as an electric generator with a simple configuration.

Moreover, in the present embodiment, as shown in FIG. 2, the first rotary electric machine 24 and the second rotary electric machine 64 are arranged along the vehicle anteroposterior direction in such a manner that an axis line Ax2 of the second rotor 78 is located closer to the vehicle body front side than an axis line Ax1 of the first rotor 38. This can decrease the thickness of the swing unit 12. Furthermore, the diameter of one rotary electric machine does not need to be set large differently from a multilayer coaxial rotary electric machine. This can prevent the height position of the lower surface of the swing unit 12 from becoming excessively low.

According to the present embodiment, the first one-way clutch unit 72 and the second one-way clutch unit 74 are provided for the second shaft 66 and thus the configuration of the swing unit 12 can be made compact.

Furthermore, the first power transmitting mechanism 68 and the second power transmitting mechanism 70 are disposed closer to the inside in the vehicle width direction than the first rotary electric machine 24. This can make the swing unit 12 more compact.

In the present embodiment, the gear 82 is bonded to the outer circumferential surface of the ring body 94 configuring the first one-way clutch unit 72 and the idle gears 84 and 86 are provided between the gear 82 and the outside ring gear 54. This can make the rotational directions of the ring body 94 and the outside ring gear 54 opposite to each other. Due to this feature, with a simple configuration, the motion of the gear 82, the idle gears 84 and 86, and the outside ring gear 54 can be locked in the regeneration mode. Furthermore, in the second driving mode, the rotational drive force of the second shaft 66 can be transmitted to the outside ring gear 54 via the first one-way clutch unit 72, the gear 82, and the idle gears 84 and 86.

It is obvious that the present invention is not limited to the above-described embodiment and various configurations can be employed without departing from the gist of the present invention.

For example, the second power transmitting mechanism 70 may be configured by a chain or a belt wound around the first sprocket 88 bonded to the carrier 52 and the second sprocket 90 bonded to the second one-way clutch unit 74.

Furthermore, the second power transmitting mechanism 70 may be configured so as to include a first gear having the outer circumferential surface to which the second one-way clutch unit 74 is bonded, a second gear bonded to the outer circumferential surface of the drive shaft 32, and an idle gear that is provided between these gears and transmits the rotational drive force of the first gear to the second gear. Moreover, the power transmitting device 21 may have a configuration in which the centrifugal clutch 28 is not provided.

The clutch mechanism 58 is not limited to the example in which it is provided for the ring gear 50. For example, it may be provided for the gear 82, the idle gear 84, or the idle gear 86.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power output device for outputting a rotational drive force to a drive shaft, the vehicle power output device comprising:
a first rotary electric machine capable of rotating a first shaft;
a second rotary electric machine capable of rotating a second shaft in both forward and opposite directions;
a planetary gear mechanism operatively connected to the first shaft and the drive shaft;
a first power transmitting mechanism for transmitting a rotational drive force of the second shaft to the planetary gear mechanism;
a second power transmitting mechanism for transmitting a rotational drive force of the second shaft to the drive shaft;
a first one-way clutch unit for permitting transmission of a rotational drive force from the second shaft to the first power transmitting mechanism only when the second shaft rotates in the forward direction; and
a second one-way clutch unit for permitting transmission of a rotational drive force from the second shaft to the second power transmitting mechanism only when the second shaft rotates in the opposite direction,
wherein the planetary gear mechanism combines a rotational drive force transmitted from the first shaft and a rotational drive force transmitted from the first power transmitting mechanism and transmits the combined rotational drive force to the drive shaft with a rotational speed increased.

2. The vehicle power output device according to claim 1, wherein the second one-way clutch unit includes a ring body disposed to surround an outer circumferential surface of the second shaft and an inner circumferential surface of the ring body including a plurality of trenches having a circular arc sectional shape formed along a circumferential direction with roller bearings and elastic members operatively provided in respective trenches formed in the ring body, wherein when the second shaft rotates in a counterclockwise direction, the second shaft and the ring body integrally rotates in the counterclockwise direction and wherein when the second shaft rotates in a clockwise direction, the second shaft idly rotates relative to the ring body.

3. The vehicle power output device according to claim 1, wherein the planetary gear mechanism includes:
a sun gear connected to the first shaft,
a ring gear to which a rotational drive force of the first power transmitting mechanism is transmitted,
a planetary gear that meshes with each of the sun gear and the ring gear, and
a carrier that rotatably supports the planetary gear in such a state so as to be coupled to the drive shaft.

4. The vehicle power output device according to claim 3, wherein the second power transmitting mechanism is configured by a chain or a belt wound around the second one-way clutch unit and the carrier or by a gear.

5. The vehicle power output device according to claim 1, and further comprising:
 clutch means provided on a power transmission path between the first one-way clutch unit and the planetary gear mechanism, the clutch means permitting transmission of a rotational drive force from the second shaft to the planetary gear mechanism and blocking transmission of a rotational drive force from the planetary gear mechanism to the second shaft.

6. The vehicle power output device according to claim 5, wherein the planetary gear mechanism includes:
 a sun gear connected to the first shaft,
 a ring gear to which a rotational drive force of the first power transmitting mechanism is transmitted,
 a planetary gear that meshes with each of the sun gear and the ring gear, and
 a carrier that rotatably supports the planetary gear in such a state so as to be coupled to the drive shaft.

7. The vehicle power output device according to claim 6, wherein the second power transmitting mechanism is configured by a chain or a belt wound around the second one-way clutch unit and the carrier or by a gear.

8. The vehicle power output device according to claim 1, wherein the first one-way clutch unit includes a ring body disposed to surround an outer circumferential surface of the second shaft and an inner circumferential surface of the ring body including a plurality of trenches having a circular arc sectional shape formed along a circumferential direction with roller bearings and elastic members operatively provided in respective trenches formed in the ring body.

9. The vehicle power output device according to claim 8, wherein the roller bearings are biased toward a cam surface by the elastic members to contact the cam surface in a state wherein the second shaft and the ring body are stationary and the roller bearings are fixed between the cam surface and the outer circumferential surface of the second shaft.

10. The vehicle power output device according to claim 9, wherein when the second shaft rotates in a clockwise direction, the ring body rotates in the clockwise direction and wherein when the second shaft rotates in a counterclockwise direction, the roller bearings move away from the cam surface to enable the second shaft to idly rotate relative to the ring body.

11. A vehicle energy regenerating device that converts a rotational drive force of a drive shaft to electric energy, the vehicle energy regenerating device comprising:
 a first rotary electric machine having a first rotor;
 a second rotary electric machine having a second rotor;
 a first shaft that rotates in conjunction with the first rotor;
 a second shaft that rotates in conjunction with the second rotor;
 a planetary gear mechanism capable of transmitting a rotational drive force between the drive shaft and the first shaft;
 a power transmitting mechanism capable of transmitting a rotational drive force between the second shaft and the planetary gear mechanism;
 clutch means for permitting transmission of the rotational drive force from the second shaft to the planetary gear mechanism and for blocking transmission of a rotational drive force from the planetary gear mechanism to the second shaft; and
 a one-way clutch unit that transmits a rotational drive force of the second shaft to the power transmitting mechanism and locks motion of the power transmitting mechanism in blocking transmission of the rotational drive force from the planetary gear mechanism to the second shaft by the clutch means;
 wherein if only the first rotary electric machine is driven, a rotational drive force of the first rotor is transmitted to the drive shaft via the first shaft and the planetary gear mechanism,
 if both the first rotary electric machine and the second rotary electric machine are driven, the rotational drive force transmitted from the first rotor to the first shaft and a rotational drive force transmitted from the second rotor to the power transmitting mechanism via the second shaft and the one-way clutch unit are combined by the planetary gear mechanism to be transmitted to the drive shaft with a rotational speed increased, and
 if the drive shaft is rotated, a rotational drive force transmitted from the drive shaft to the planetary gear mechanism is transmitted to the first rotor via the first shaft without being transmitted to the power transmitting mechanism by action of the one-way clutch unit and the clutch means, to perform regeneration.

12. The vehicle energy regenerating device according to claim 11, wherein the planetary gear mechanism includes:
 a sun gear connected to the first shaft,
 a ring gear to and from which a rotational drive force is transmitted from and to the power transmitting mechanism,
  a planetary gear for meshing with each of the sun gear and the ring gear, and
  a carrier that rotatably supports the planetary gear in such a state so as to be coupled to the drive shaft; and
 the clutch means is provided for the ring gear.

13. The vehicle energy regenerating device according to claim 12, wherein the ring gear has a first ring gear for engaging with the power transmitting mechanism and a second ring gear for meshing with the planetary gear; and
 the clutch means includes:
  a first connection shaft connected to the first ring gear and a second connection shaft that is provided coaxially with the first connection shaft and is connected to the second ring gear,
  an outer ring member surrounding one end part of the second connection shaft,
  a plurality of first engaging members are connected to the first connection shaft and are disposed at predetermined intervals along circumferential direction of the second connection shaft between the second connection shaft and the outer ring member,
  a pair of rollers is disposed between the first engaging members adjacent to each other,
  a cam surface is formed in an outer circumferential surface of one end part of the second connection shaft and is in contact with the pair of rollers to press the pair of rollers against an inner circumferential surface of the outer ring member and fix the pair of rollers by wedge action,
  an elastic member is disposed between the pair of rollers and biases the rollers toward the cam surface,
  a recess formed in one end surface of the second connection shaft, and
  a plurality of second engaging members inserted into the recess in such a state so as to be fixed to the other end surface of the first connection shaft.

14. The vehicle energy regenerating device according to claim 12, wherein, the power transmitting mechanism includes:
- an annular gear bonded to an outer circumferential surface of the one-way clutch unit,
- a first idle gear that meshes with the annular gear, and
- a second idle gear that meshes with the first idle gear and the ring gear.

15. A vehicle energy regenerating device for converting a rotational drive force of a drive shaft to electric energy, the vehicle energy regenerating device comprising:
- a first rotary electric machine having a first rotor;
- a second rotary electric machine having a second rotor;
- a first shaft that rotates in conjunction with the first rotor;
- a second shaft that rotates in conjunction with the second rotor;
- a planetary gear mechanism capable of transmitting a rotational drive force between the drive shaft and the first shaft;
- a power transmitting mechanism capable of transmitting a rotational drive force between the second shaft and the planetary gear mechanism; and
- clutch means for permitting transmission of the rotational drive force from the second shaft to the planetary gear mechanism and blocks transmission of a rotational drive force from the planetary gear mechanism to the second shaft;

wherein if only the first rotary electric machine is driven, a rotational drive force of the first rotor is transmitted to the drive shaft via the first shaft and the planetary gear mechanism, if both the first rotary electric machine and the second rotary electric machine are driven, the rotational drive force transmitted from the first rotor to the first shaft and a rotational drive force transmitted from the second rotor to the power transmitting mechanism via the second shaft and a one-way clutch unit are combined by the planetary gear mechanism to be transmitted to the drive shaft with a rotational speed increased, and if the drive shaft is rotated, a rotational drive force transmitted from the drive shaft to the planetary gear mechanism is transmitted to the first rotor via the first shaft without being transmitted to the power transmitting mechanism by action of the clutch means, to perform regeneration.

* * * * *